D. MATER.

Plow.

No. 3,488.

Reissued June 8, 1869.

Witnesses
Jr. R. Edson
S. Edwd Ott

Inventor
D. Mater
D. P. Holloway & Co
Attys.

N. PETERS, Photo-Lithographer, Washington, D. C.

UNITED STATES PATENT OFFICE.

DANIEL MATER, OF BELLMORE, INDIANA.

IMPROVEMENT IN PLOWS.

Specification forming part of Letters Patent No. 82,858, dated October 6, 1868; Reissue No. 3,188, dated June 8, 1869.

*To all whom it may concern:*

Be it known that I, DANIEL MATER, of Bellmore, in the county of Parke and State of Indiana, have invented a new and useful Improvement in Plows; and I hereby declare the following to be a full, clear, and exact description of the same, by which any one skilled in the art may make and operate the same.

Figure 1:
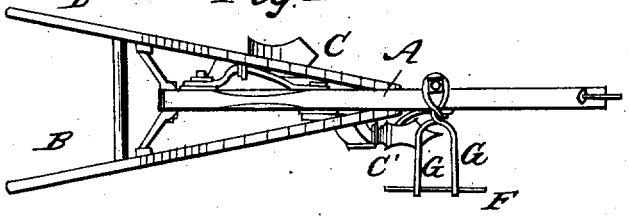
Figure 2:
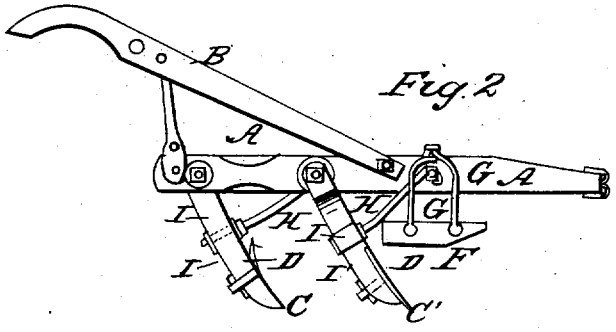
Figure 3:
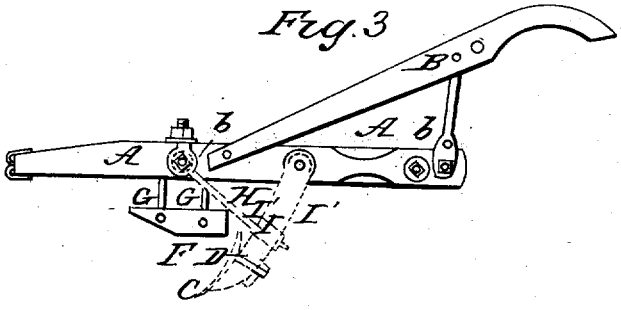

Figure 1 is a plan view of my improved plow, and Fig. 2 is an elevation of the same. Fig. 3 is a left-hand elevation, showing the rear standard in red lines, and arranged in its forward position.

Corresponding letters represent corresponding parts in all of the figures.

A is the beam of the plow, and B B are the handles, which are of usual construction, the beam being provided with the usual drag-iron at its front end, and at its rear end with braces for the support of the handles, said braces being provided with a series of holes in their lower ends, by means of which the handles of the plows may be raised or lowered, as desired.

C C′ are the shovels, which are of peculiar construction, they being provided with staples which embrace the standards, to which they are secured by means of keys driven between the edges of such standards and the end of the staple, and also with projections upon their inner surface, which come in contact with the sides of the standards, and which, when the shovel is keyed firmly to such standards, prevent the possibility of its being turned away from its vertical or proper position.

The shovel represented by C′ shows the above-described form of construction, which is designed more particularly for such of the shovels as are constructed, as that is, with a view to rendering them capable of being used with either one of their ends downward, by which means the inclination of their faces is changed from left to right, and the operator is enabled to turn the furrow toward the row of the growing crop, or directly away from the same. When the shovels are designed merely as cultivators, without reference to the direction given to the furrows, the key and staple will be found to be sufficient to keep the shovel in position, and in such cases the projection referred to may be dispensed with.

D D are the standards or hangers, to which the shovels are secured, as above described, which standards or hangers are made of wrought-iron or of any other suitable material, and are bolted to the beam and otherwise secured in their position by means of the braces E E, as shown in the drawings.

It will be apparent that by removing the nuts which are screwed upon the bolts which secure the rear standard and its brace to the beam of the plow, and also the one which secures the brace of the forward standard, the rear standard may be slipped from the bolts which hold it, and be carried forward, so as to be opposite the forward standard on the other end of the bolt sustaining said forward standard, and that then the plow may be converted into an implement for covering corn and other kinds of grain which is planted in hill or rows, no further change in the device being required than merely to place the double-pointed shovel in such a position that its furrow will be turned to the right direction, or that it may be removed and a shovel corresponding to the rear one put in its place.

It will be seen that I am enabled to effect this change by means of the arrangement of the bolts which pass through the eyes on the standards and braces, said bolts being set at equal distances apart, so that when the eye of the rear standard is placed on the bolt used to sustain the brace, the brace will extend forward to and permit its eye to slip onto the forward bolt, as shown in red.

F is a shield, which may be of wrought iron or steel, and which consists of a plate of thin metal of, say, ten inches in length by, say, from two to six inches in width, and has its lower forward corner cut away so as to form a segment of a circle, and so that any obstruction with which it meets may pass underneath it, and not be carried along with it, the object of this device being to prevent the clods of earth from falling upon the crop and covering it up in the earlier stages of its growth.

G is the arm or hinge to which the shield is attached. It is constructed of a bar of iron with a slot or loop in its upper end, by which it is secured to the beam of the plow by means of an eyebolt, which passes over a bolt which secures it to the beam, the eyebolt being provided with a nut, which screws down upon the hinge.

I are clamps, which embrace the standards D D upon their outer sides and edges, but which extend inwardly for a distance sufficient to enable them to receive and support the lower ends of braces E E, which result is accomplished by the means of two nuts, I′, which are screwed upon said braces, one on either side of the clamp, thus forcing said clamp into contact with the standards E E and securing them all in position. From that portion of the hinge which constitutes the loop or slot which is used for regulating the distance at which the shield shall run from the shovel, as well as from the rows of the growing crops, there extends two arms, both of which are bent in such a manner as that their lower portions assume a vertical position, which lower portions are riveted or otherwise secured to the shields, said arms forming the supports of the same, and serving to keep it in its proper position.

One of the advantages which arises from my method of constructing the shovel is that they may be made at the factory and sent out into the country and placed upon the plow with the certainty of their fitting upon the standard, which will avoid the necessity of transporting the plow to the factory or the shop for the purpose of having it furnished with new shovels, as the owner can always do it himself, and thus save much time and expense.

Having thus described my invention, what I claim, and desire to secure by Letters Patent, is—

1. The arrangement of the transversely-adjustable shield F with reference to the beam of the plow and shovel C, substantially as shown and described.

2. In combination with the beam and standards, the brace-rods H, clamps I, and nuts I′, substantially as and for the purpose set forth.

3. The construction of the shovel C′ with its guides or studs for retaining the same in position, in connection with the staple for securing it to the standard.

4. The arrangement of the bolts *b b b* at equal distances apart, in combination with the rear standard and brace, as set forth, for the purpose described.

In testimony whereof I have signed my name to this specification before two subscribing witnesses.

DANIEL MATER.

Witnesses:

J. W. BRECKENRIDGE,

WILLIAM REEDER.